(12) United States Patent
Peng et al.

(10) Patent No.: US 9,405,641 B2
(45) Date of Patent: Aug. 2, 2016

(54) SYSTEM AND METHOD FOR PROVIDING SERVER APPLICATION SERVICES WITH HIGH AVAILABILITY AND A MANY-TO-ONE HARDWARE CONFIGURATION

(75) Inventors: Peter Peng, Beijing (CN); Min Yan, Beijing (CN); Zhenghua Xu, Beijing (CN)

(73) Assignee: CA, Inc., New York, NY (US)

( * ) Notice: Subject to any disclaimer, the term of this patent is extended or adjusted under 35 U.S.C. 154(b) by 890 days.

(21) Appl. No.: 13/034,111

(22) Filed: Feb. 24, 2011

(65) Prior Publication Data

US 2012/0221526 A1 Aug. 30, 2012

(51) Int. Cl.
*G06F 17/30* (2006.01)
*G06F 11/20* (2006.01)

(52) U.S. Cl.
CPC ........ *G06F 11/2025* (2013.01); *G06F 11/2038* (2013.01); *G06F 11/2028* (2013.01)

(58) Field of Classification Search
CPC .................................................. G06F 11/2025
USPC ....................................................... 707/654
See application file for complete search history.

(56) References Cited

U.S. PATENT DOCUMENTS

| | | | | |
|---|---|---|---|---|
| 5,652,908 A * | 7/1997 | Douglas et al. | ................. | 714/4.4 |
| 5,812,751 A * | 9/1998 | Ekrot et al. | ..................... | 714/4.5 |
| 5,852,724 A * | 12/1998 | Glenn et al. | .................. | 709/239 |
| 8,135,732 B2 | 3/2012 | Peng et al. | ..................... | 707/769 |
| 8,489,721 B1 | 7/2013 | Gokhale et al. | | |
| 2004/0153757 A1 * | 8/2004 | Blakeney | ........................ | 714/13 |
| 2005/0071195 A1 | 3/2005 | Cassel et al. | ...................... | 705/2 |
| 2005/0223047 A1 | 10/2005 | Shah et al. | ..................... | 707/201 |
| 2006/0101081 A1 | 5/2006 | Lin et al. | ......................... | 707/200 |
| 2007/0055765 A1 | 3/2007 | Lisiecki et al. | ................ | 709/223 |
| 2007/0168500 A1 | 7/2007 | D'Souza et al. | ............... | 709/224 |
| 2007/0220323 A1 * | 9/2007 | Nagata | ............................. | 714/13 |
| 2008/0077636 A1 | 3/2008 | Gupta et al. | ................... | 707/204 |
| 2008/0133300 A1 | 6/2008 | Jalinous | ............................ | 705/7 |
| 2008/0294648 A1 | 11/2008 | Lin et al. | ......................... | 707/10 |
| 2009/0024416 A1 | 1/2009 | McLaughlin et al. | ............ | 705/3 |
| 2009/0292930 A1 | 11/2009 | Marano et al. | ................. | 713/189 |
| 2011/0066611 A1 | 3/2011 | Groeneveld et al. | .......... | 707/723 |
| 2011/0173491 A1 * | 7/2011 | Takamoto et al. | ........... | 714/4.11 |
| 2011/0219019 A1 | 9/2011 | Peng et al. | ..................... | 707/769 |
| 2011/0225165 A1 | 9/2011 | Burstein | ........................ | 707/741 |
| 2011/0239037 A1 | 9/2011 | Peng et al. | ......................... | 714/3 |
| 2011/0289046 A1 | 11/2011 | Leach et al. | ................... | 707/602 |
| 2013/0007505 A1 | 1/2013 | Spear | | |

OTHER PUBLICATIONS

Microsoft Corporation, Microsoft SharePoint Products and Technologies Server Farm Architecture, 2007, 36 pages.*
Notice of Allowance as issued for U.S. Appl. No. 13/219,421, dated Jan. 31, 2014.

* cited by examiner

*Primary Examiner* — Apu Mofiz
*Assistant Examiner* — Dara J Glasser
(74) *Attorney, Agent, or Firm* — Pillsbury Winthrop Shaw & Pittman LLP

(57) ABSTRACT

A suite of network-based services, such as the services corresponding to the server application distributed by Microsoft® SharePoint™, may be provided to users with high availability. The suite of network-based services may include browser-based collaboration functions, process management functions, index and search functions, document-management functions, help and help search functions, and/or other functions. A plurality of computing devices functioning as servers may be backed up by a single computing device.

16 Claims, 2 Drawing Sheets

SYSTEM AND METHOD FOR PROVIDING SERVER APPLICATION SERVICES WITH HIGH AVAILABILITY AND A MANY-TO-ONE HARDWARE CONFIGURATION

FIELD OF THE INVENTION

The invention relates to providing server application services, such as the services provided by the server application offered by Microsoft® SharePoint™, with high availability and a many-to-one back up hardware configuration.

BACKGROUND OF THE INVENTION

Microsoft® SharePoint™ may be a rich enterprise server application that provides full content management features, implement business processes, and/or provide access to information related to organizational goals and/or processes.

High availability may be a system design protocol that ensures a certain degree of operational continuity. Conventional configurations of Microsoft® SharePoint™ may be challenged to meet high availability standards for a variety of reasons. For example, conventional configurations of servers providing redundancy involve a one-to-one standby server to online server set up that is costly in terms of hardware, bandwidth, and/or other resources.

SUMMARY

One aspect of the invention relates to a system and method providing a suite of network-based services, such as the services corresponding to the server application distributed by Microsoft® SharePoint™, to users with high availability. The suite of network-based services may include browser-based collaboration functions, process management functions, index and search functions, document-management functions, help and help search functions, and/or other functions. The system and method may enable a plurality of computing devices functioning as servers to be backed up by a single computing device, may make the services available with high availability, and/or may provide other enhancements.

In some implementations, a single standby server devices may be configured to backup a server farm having two or more servers configured to coordinate to serve a server application. The single standby server device may be configured to execute computer program modules including a server application module, a monitor module, an information transfer module, a server replacement module, a changeover coordination module, configuration management module, and/or other modules.

The server application module may be configured to provide one or more server application services associated with a server application to be backed up for the server farm. For example, the server application may include the collection of software elements available from Microsoft® SharePoint™. The server application services may include one or more of a web front-end service, an indexing service, a central administration service, one or more shared services, a database service, and/or other sub-modules.

The monitor module may be configured to determine whether a changeover of the server farm should be initiated. Such determinations may be made based on user input or command, and/or based on monitoring the operation of the server farm. Disruptions in operation of one or more of the servers in the server farm may cause the monitor module to determine that a changeover of the server farm to the single standby device should be initiated.

The information transfer module may be configured to transfer information stored by the servers of the server farm to the electronic storage of the standby server. This transfer of information may take place in response to determination by the monitor module that a changeover should be initiated. The information transferred may include a configuration database for the server farm, a central administration website associated with the server farm, information being served by the server farm, and/or other information.

The server replacement module may be configured to replace the servers of the server farm with the standby server device. This replacement may be made by replacing the servers of the server farm with the standby server device in information transferred from the servers of the server farm to the electronic storage of the standby server. For example, the server replacement module may be configured to replace the servers of the server farm with the standby server device in the configuration database, and/or other information.

The changeover coordination module may be configured to initiate startup, on the server application module executed on the standby server device, of the services previously provided by the server farm. The changeover coordination module may be configured to manage the order in which services are started up. For example, the changeover coordination module may be configured such that the database service and the central administration service may be started up before other services. This may bring the configuration database and/or the central administration website online before other services are started up.

The configuration management module may be configured to adjust the configuration database after transfer to the electronic storage of the standby server. This may be done in order to consolidate server roles that become redundant during changeover from the plurality of servers in the server farm to the single standby server. This may involve scanning the configuration database and/or the central administration website to identify instances of redundancy. The identified instances of redundancy may then be addressed by deleting information, adjusting information, adjusting control settings, and/or performing other adjustments.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
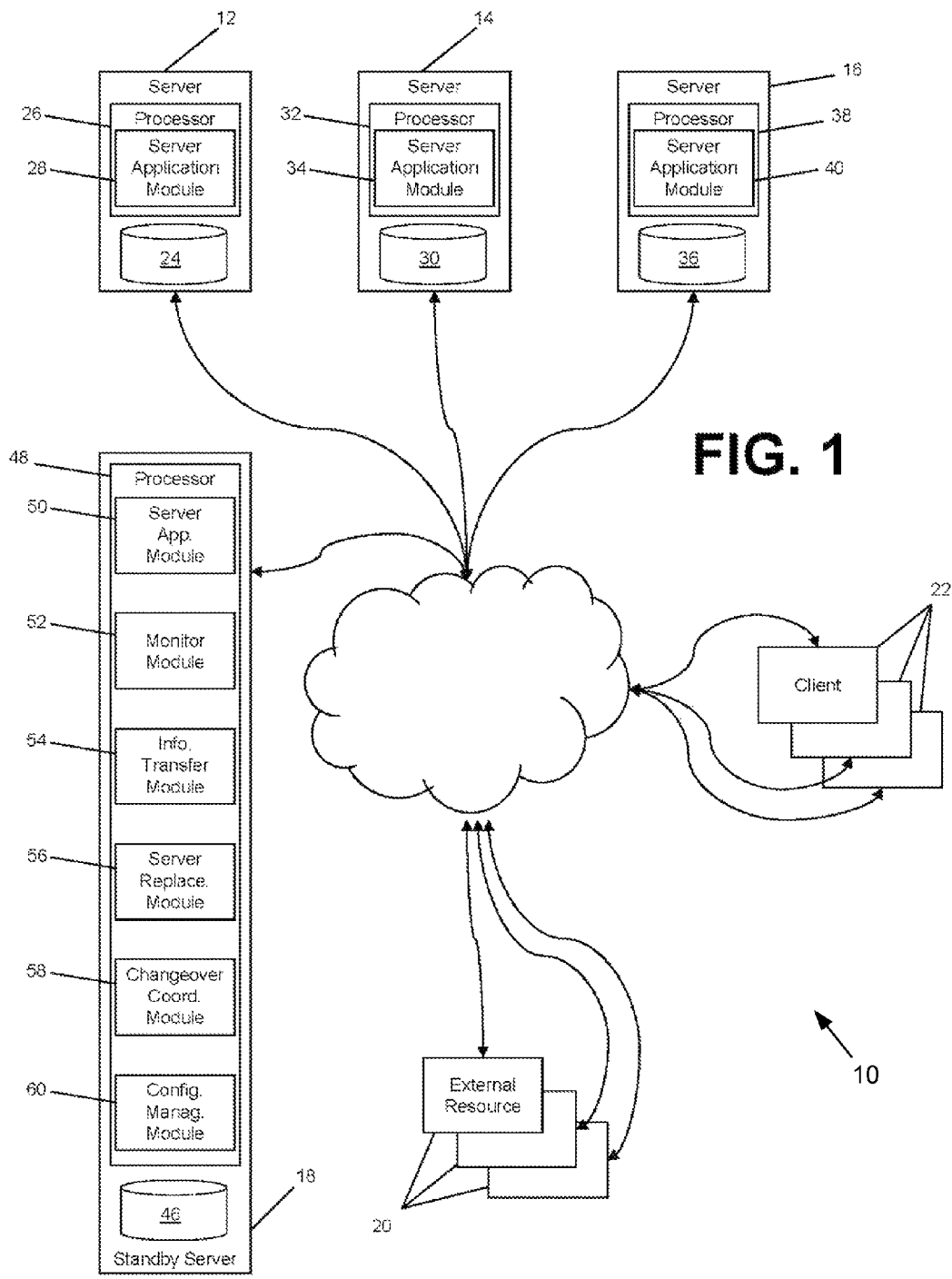
FIG. 1 illustrates a system configured to provide a suite of network-based services to users with high availability, in accordance with one or more embodiments of the invention.

FIG. 1 illustrates a system 10 configured to provide a suite of network-based services to users with high availability. The suite of network-based services may include browser-based collaboration functions, process management functions, index functions, search functions, help search functions, document-management functions, and/or other functions. The suite of network-based services may correspond to services provided by a server application such as Microsoft® SharePoint™ being executed on one or more processors of one or more servers. As used herein, the term "high availability" may refer a system design protocol that ensures a certain degree of operational continuity during a given measurement period. In some implementations, system 10 may include a first production server 12, a second production server 14, a third production server 16, a standby server device 18, and/or other components.

The system 10 may leverage one or more external information sources 20. Users may interface with system 10 and/or external information sources 20 via client computing platforms 22. The components of system 10, external information sources 20, and/or client computing platforms 22 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which system 10, external information sources 20, and/or client computing platforms 22 are operatively linked via some other communication media.

A given client computing platform 22 may include one or more processors configured to execute computer program modules. The computer program modules may be configured to enable one or more users associated with the given client computing platform 22 to interface with system 10 and/or external information sources 20, and/or provide other functionality attributed herein to client computing platforms 22. By way of non-limiting example, the given client computing platform 22 may include one or more of a desktop computer, a laptop computer, a handheld computer, a NetBook, a Smartphone, and/or other computing platforms.

The external information sources 20 may be configured to provide information to system 10. This information may include content, user information, information related to achievements or accomplishments of users, and/or other information.

During ordinary operation, first production server 12, second production server 14, third production server 16, and/or other production servers (not shown) may cooperate to provide the network-based services of the server application to users of client computing platforms 22 via the network. As such, first production server 12, second production server 14, and/or third production server 16 may be included in a "server farm" configured to provide the server application services of the server application. In order for a server, such as first production server 12, second production server 14, or third production server 16, in the server farm, the server may have to be included in a configuration database for the server farm. An entry in the configuration database including the server in the server farm may indicate a server role of the server, and/or other information.

The server farm may serve, or host, the network-based services over the network to client computing platforms 22. In order to provide the network-based services with high availability, standby server device 18 may be configured as a back-up to first production server 12, second production server 14, and third production server 16 that replaces first production server 12, second production server 14, third production server 16 and/or any other production servers in the server farm in case of failover or switchover. Failover may include situations in which a server (or one or more individual services hosted by a server) fails in an unexpected manner. Switchover may include situations in which the switch from the server farm to standby server device 18 is performed intentionally. For example, switchover may be executed to perform maintenance, to test one or servers, and/or for other purposes. For convenience, the term "changeover" will be used herein to refer to switching services from one server to another for either of failover or switchover.

Although first production server 12, second production server 14, and third production server 16 are each illustrated as a single entity in FIG. 1, this is not intended to be limiting. One or more of first production server 12, second production server 14, and/or third production server 16 may represent a set of two or more servers that cooperate to provide the functionality attributed to the individual server(s) herein. The illustration of standby server device 18 as a single entity, on the other hand, may be indicative of the operation of standby server device 18 as a single piece of server hardware in backing up an entire server farm including first production server 12, second production server 14, and/or third production server 16.

The first production server 12, second production server 14, third production server 16, and/or standby server device 18 may be in operative communication with each other. This operative communication may be accomplished via wireless communication, wired communication, network communication, communication via dedicated lines or channels, and/or other electronic communication media.

The first production server 12 may include electronic storage 24, one or more processors 26, and/or other components. Electronic storage 24 may comprise electronic storage media that electronically stores information. The electronic storage media of electronic storage 24 may include one or both of system storage that is provided integrally (i.e., substantially non-removable) with first production server 12 and/or removable storage that is removably connectable to first production server 12 via, for example, a port (e.g., a USB port, a firewire port, etc.) or a drive (e.g., a disk drive, etc.). Electronic storage 24 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 24 may store software algorithms, information determined by processor 26, information received via the network, and/or other information that enables first production server 12 to function properly. Electronic storage 24 may be a separate component within first production server 12, or electronic storage 24 may be provided integrally with one or more other components of first production server 12 (e.g., processor 26).

Processor 26 may be configured to provide information processing capabilities in first production server 12. As such, processor 26 may include one or more of a digital processor, an analog processor, a digital circuit designed to process information, an analog circuit designed to process information, a state machine, and/or other mechanisms for electronically processing information. Although processor 26 is shown in FIG. 1 as a single entity, this is for illustrative purposes only. In some implementations, processor 26 may include a plurality of processing units. These processing units may be physically located within the same device, or processor 26 may represent processing functionality of a plurality of devices operating in coordination.

As is shown in FIG. 1, processor 26 may be configured to execute one or more computer program modules. The one or more computer program modules may include a server application module 28, and/or other modules. Processor 26 may be configured to execute module 28 by software; hardware; firmware; some combination of software, hardware, and/or firmware; and/or other mechanisms for configuring processing capabilities on processor 26. The description of the functionality provided by modules 28 described below is for illustrative purposes, and is not intended to be limiting, as module 28 may provide more or less functionality than is described.

The server application module 28 may be configured to provide one or more server application services associated with a server application. As used herein, the term "server application" may refer to one or more software elements that cause processor 26 to provide a suite of network-based services to users in a coordinated and cooperative manner with first production server 12, second production server 14, and/or third production server 16. For example, the server application may include the collection of software elements available from Microsoft® SharePoint™. The server application module 28 may be configured such that the server application provides application programming interfaces through which server application module 28 communicates with other computer program modules that are not an integral part of server application module 28.

In cooperating with second production server 14, and/or third production server 16 to provide the server application services to users, the server application module 28 may provide one or more of the server application services. The server application services may include one or more of a web front-end service, an indexing service, a central administration service, one or more shared services, a database service, and/or other sub-modules.

In some implementations, server application module 28 may be configured to provide the database service. The database service may be configured to provide database services to users of client computing platforms 22 via the network. This may include processing database commands, queries, content, and/or other information related to a database, performing the requested actions and/or obtaining the requested information, and providing the results to the requesting client computing platform(s) 22. The database service may be configured to maintain a configuration database. The configuration database includes the configuration and site mappings for the servers in the server farm. This may include, for example, which components are configured in specific server, the components' status, the security settings, and/or other configurations and/or site mappings.

The second production server 14 may include electronic storage 30, one or more processors 32, and/or other components. Electronic storage 30 may comprise electronic storage media that electronically stores information. The electronic storage media of electronic storage 30 may include one or both of system storage that is provided integrally (i.e., substantially non-removable) with second production server 14 and/or removable storage that is removably connectable to second production server 14 via, for example, a port (e.g., a USB port, a firewire port, etc.) or a drive (e.g., a disk drive, etc.). Electronic storage 30 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 30 may store software algorithms, information determined by processor 32, information received via the network, and/or other information that enables second production server 14 to function properly. Electronic storage 30 may be a separate component within second production server 14, or electronic storage 30 may be provided integrally with one or more other components of second production server 14 (e.g., processor 32).

Processor 32 may be configured to provide information processing capabilities in second production server 14. As such, processor 32 may include one or more of a digital processor, an analog processor, a digital circuit designed to process information, an analog circuit designed to process information, a state machine, and/or other mechanisms for electronically processing information. Although processor 32 is shown in FIG. 1 as a single entity, this is for illustrative purposes only. In some implementations, processor 32 may include a plurality of processing units. These processing units may be physically located within the same device, or processor 32 may represent processing functionality of a plurality of devices operating in coordination.

As is shown in FIG. 1, processor 32 may be configured to execute one or more computer program modules. The one or more computer program modules may include a server application module 34, and/or other modules. The server application module 34 may be substantially the same as server application module 28, and may be configured to provide one or more of the server application services associated with the server application.

In some implementations, server application module 34 may be configured to provide the indexing service, may provide the central administration service, may perform one or more shared services provider roles, and/or may provide other services. The indexing service may index information served by the server farm, metadata related to information served by the server farm, and/or other information. The indexing service may crawl content, logs, and/or other information sources associated with the server farm, and/or other information and create an index in an ongoing manner. This index may be referenced to respond to queries and/or searches by users, administrators, and/or for other purposes.

The central administration service may be configured to manage administration functions within the server farm. This may include serving a central administration database through which the configuration database is accessed by the servers (e.g., first production server 12, second production server 14, and third production server 16) of the server farm. The central administration service may provide users with the capabilities to configure the servers and the components/roles on them, modify security settings, configure web sites, provide access to other configuration parameters.

As a shared service provider, server application module 34 may be configured to provide one or more shared services within the server farm. The shared services may include one or more of a web-app server service, a query service, a spreadsheet calculation service, a help search service, and/or other services.

The web-app server service may be configured to provide web application server functionality to client computing platforms 22. This may include executing a plurality of different information processing tasks at the request of client computing platforms 22, and then returning the results to client computing platforms 22.

The query service may be configured to provide users with the capability to search desired information, for example, for a particular person (or group of people), for some specific document (or set of documents) in a web site, and/or other information The spreadsheet calculation service may be configured to provide users with the capability to do the same operations on a spreadsheet files (e.g., a .XLS file) within a web browser as would be permitted with Microsoft Office Excel software, but without having the Microsoft Office Excel installed on the client computer.

The help search service may be configured to provide users with the capability to search help information for the SharePoint configurations/operations. For example, the help search service may receive a request for information as to how to backup or restore a web site, may search help information, and may return the pertinent information to the requesting user.

The third production server 16 may include electronic storage 36, one or more processors 38, and/or other components. Electronic storage 36 may comprise electronic storage media that electronically stores information. The electronic storage media of electronic storage 36 may include one or both of system storage that is provided integrally (i.e., substantially non-removable) with third production server 16 and/or removable storage that is removably connectable to third production server 16 via, for example, a port (e.g., a USB port, a firewire port, etc.) or a drive (e.g., a disk drive, etc.). Electronic storage 36 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 36 may store software algorithms, information determined by processor 38, information received via the network, and/or other information that enables third production server 16 to function properly. Electronic storage 36 may be a separate component within third production server 16, or electronic storage 36 may be provided integrally with one or more other components of third production server 16 (e.g., processor 38).

Processor 38 may be configured to provide information processing capabilities in third production server 16. As such, processor 38 may include one or more of a digital processor, an analog processor, a digital circuit designed to process information, an analog circuit designed to process information, a state machine, and/or other mechanisms for electronically processing information. Although processor 38 is shown in FIG. 1 as a single entity, this is for illustrative purposes only. In some implementations, processor 38 may include a plurality of processing units. These processing units may be physically located within the same device, or processor 38 may represent processing functionality of a plurality of devices operating in coordination.

As is shown in FIG. 1, processor 38 may be configured to execute one or more computer program modules. The one or more computer program modules may include a server application module 40, and/or other modules. The server application module 40 may be substantially the same as server application module 28 and/or server application module 34, and may be configured to provide one or more of the server application services associated with the server application.

In some implementations, server application module 40 may be configured to execute the web front-end service. The web front-end service may be configured to perform the functionality of a front-end web server in serving content over the network via a network communication protocol (e.g., HTTP and/or other protocols). The content may include webpages to be served to users (e.g., via client computing platforms 22). A webpage may include a document or resource that is accessible via a browser. These documents may be formatted in a mark-up format (e.g., HTML, XHTML, XML, and/or other mark-up formats). Serving the content may include receiving requests for content, receiving instructions for altering or calling content, and/or receiving other requests or instructions from client computing platform(s) 22, and then responding by providing the requested content (or locations of the requested content) to the requesting client computing platform(s) 22.

The standby server device 18 may generally be configured to backup the server farm including first production server 12, second production server 14, and third production server 16. Prior to changeover from the server farm to standby server device 18, standby server device 18 may be excluded from the configuration database of the server farm. This may mean that standby server device 18 is not indicated in the configuration database to be a part of the server farm. This may facilitate the performance of operations on the server farm that would be complicated by the presence of a server that was continually offline (since standby server device 18 would not be online until after a changeover). The standby server device 18 may include electronic storage 46, one or more processors 48, and/or other components.

Electronic storage 46 may comprise electronic storage media that electronically stores information. The electronic storage media of electronic storage 46 may include one or both of system storage that is provided integrally (i.e., substantially non-removable) with standby server device 18 and/or removable storage that is removably connectable to standby server device 18 via, for example, a port (e.g., a USB port, a firewire port, etc.) or a drive (e.g., a disk drive, etc.). Electronic storage 46 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 46 may store software algorithms, information determined by processor 48, information received via the network, and/or other information that enables standby server device 18 to function properly. Electronic storage 46 may be a separate component within standby server device 18, or electronic storage 46 may be provided integrally with one or more other components of standby server device 18 (e.g., processor 48).

Processor 48 may be configured to provide information processing capabilities in standby server device 18. As such, processor 48 may include one or more of a digital processor, an analog processor, a digital circuit designed to process information, an analog circuit designed to process information, a state machine, and/or other mechanisms for electronically processing information. Although processor 48 is shown in FIG. 1 as a single entity, this is for illustrative purposes only. In some implementations, processor 48 may include a plurality of processing units.

As is shown in FIG. 1, processor 48 may be configured to execute one or more computer program modules. The one or more computer program modules may include a server application module 50, a monitor module 52, an information transfer module 54, a server replacement module 56, a changeover coordination module 58, a configuration management module 60, and/or other modules. Processor 48 may be configured to execute modules 50, 52, 54, 56, 58, and/or 60 by software; hardware; firmware; some combination of software, hardware, and/or firmware; and/or other mechanisms for configuring processing capabilities on processor 48.

The description of the functionality provided by the different modules 50, 52, 54, 56, 58, and/or 60 described below is for illustrative purposes, and is not intended to be limiting, as any of modules 50, 52, 54, 56, 58, and/or 60 may provide more or less functionality than is described. For example, one of modules 50, 52, 54, 56, 58, and/or 60 may be eliminated, and/or some or all of its functionality may be provided by other ones of modules 50, 52, 54, 56, 58, and/or 60. As another example, processor 48 may be configured to execute one or more additional modules that may perform some or all of the functionality attributed below to one of modules 50, 52, 54, 56, 58, and/or 60.

The server application module 50 may be substantially the same as server application modules 28, 34, and/or 40. As such, server application module 50 may be configured to function as a backup for the server application services provided by the server farm. This many-to-one backup configuration in which the single standby server device 18 backs up all of the servers in the server farm may be an enhancement over conventional systems in which individual ones of first production server 12, second production server 14, and/or third production server 16 are backed up by separate standby servers. For example, the replica/standby auto-configuration procedures used for each individual server in a farm in conventional systems are not necessary. As another example, the use of standby server device 18 as the sole standby server device makes backup and high availability less costly from a hardware standpoint.

The monitor module 52 may be configured to determine whether a changeover of the server farm should be initiated. The monitor module 52 may determine whether a changeover should be initiated based on user input and/or by monitoring operation of the servers in the server farm (e.g., first production server 12, second production server 14, and third production server 16). The user input may include a user command or selection to initiate a switchover. Monitoring operation of the servers in the server farm may include communicating information to and/or from the servers (e.g., requests for operational information, operational information, requests for status information, status information, and/or other information) via the application programming interfaces of one or more of first production server 12, second production server 14, and/or third production server 16. A determination that a changeover should be initiated made by monitoring operation of the server farm may include a determination to initiate a failover based on an observed disruption in operation in one or more of first production server 12, second production server 14, and/or third production server 16. An observed disruption in operation may include a timed out operation, a disruption in communication, the failure of some application service, unavailability of some application function, and/or other disruptions.

The information transfer module 54 may be configured to effect the transfer of information stored in electronic storage 24, 30, and/or 36 associated with first production server 12, second production server 14, and/or third production server 16, respectively, to electronic storage 46 associated with standby server device 18. This transfer of information may be initiated by information transfer module 54 responsive to a determination by monitor module 52 that a changeover should be initiated. The information transferred may include one or more of the configuration database, the files associated with the central administration database, information being served by the server farm to client computing platforms 22, and/or other information. Effecting the transfer of information may include transmitting requests for information to and/or receiving information from server application module 28, server application module 34, and/or server application module 40 via their application programming interfaces.

The server replacement module 56 may be configured to replace first production server 12, second production server 14, and third production server 16 in the server farm with standby server device 18. This may include replacing first production server 12, second production server 14, and third production server 16 with standby server device 18 in the information transferred to electronic storage 46. For example, first production server 12, second production server 14, and third production server 16 may be replaced with standby server device 18 in the configuration database so that calls to functions or services previously provided by first production server 12, second production server 14, and/or third production server 16 will subsequently return standby server device 18.

The changeover coordination module 58 may be configured to initiate startup, on server application module 50, of the server application services provided by server application module 28, server application module 34, and server application module 40 subsequent to changeover. The changeover coordination module 58 may be configured to coordinate the order in which startup is initiated to ensure ongoing operation of standby server device 18. This may include first initiating startup of services that are depended upon by other services before initiating startup of the dependent services. For example, changeover coordination module 58 may be configured to initiate startup of the database service and/or the central administration service before initiating startup of other server application services. This may bring the configuration database and the central administration website online before the other server applications come online.

The consolidation of the server application services from the server farm including a plurality of servers (e.g., first production server 12, second production server 14, and third production server 16) to the single standby server device 18 may make some of the roles or services superfluous, or redundant. For example, if third production server 16 includes two or more server devices providing the web front-end service, the server farm may require a load balancing function to balance the loads between the two or more server devices. After changeover to the single standby server device 18, load balancing becomes redundant. As another example, roles that are similar, such as a search service composed of the index service and the query service. Since after changeover, the standby server device 18 may provided both the index service and the query service, the search service may become redundant. Other examples exist.

The configuration management module 60 may be configured to adjust the settings and/or configuration database of the server farm during or after changeover to reduce or eliminate this redundancy. This may involve scanning the configuration database and/or the central administration website to identify instances of redundancy. The identified instances of redundancy may then be addressed by deleting information, adjusting information, adjusting control settings, and/or performing other adjustments. The configuration management module 60 may be configured to perform this functionality after the database service and the central administration service are brought online on standby server device 18. The configuration management module 60 may be configured to perform this functional before other server application services are brought online on standby server device 18.

Figure 2:
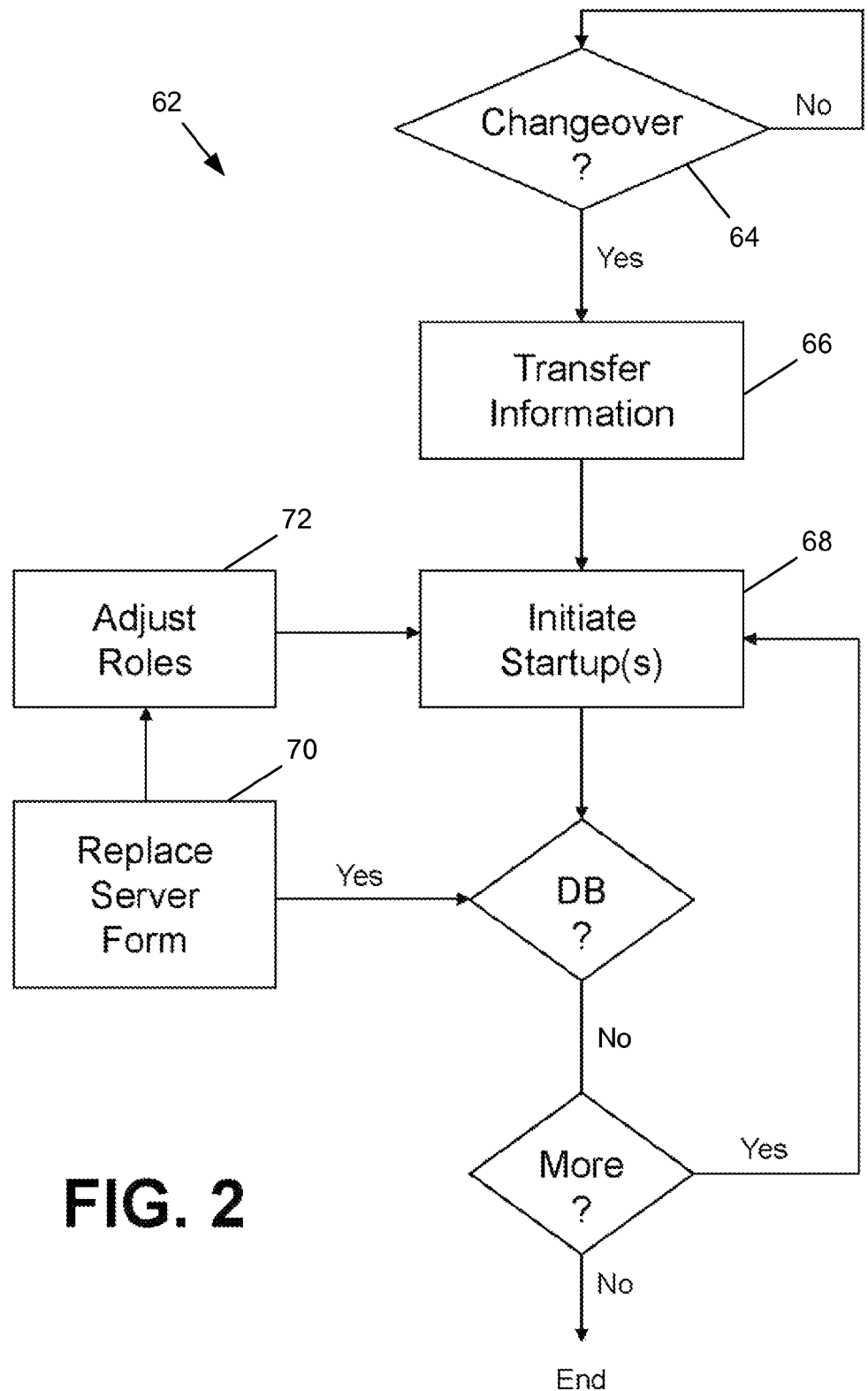
FIG. 2 illustrates a method of backing up a server farm having two or more servers configured to coordinate to serve a server application with a single standby server device, according to one or more embodiments of the invention.

FIG. 2 illustrates a method 62 of backing up a server farm having two or more servers configured to coordinate to serve a server application with a single standby server device. The operations of method 62 presented below are intended to be illustrative. In some embodiments, method 62 may be accomplished with one or more additional operations not described, and/or without one or more of the operations discussed. Additionally, the order in which the operations of method 62 are illustrated in FIG. 2 and described below is not intended to be limiting.

In some embodiments, method 62 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 62 in response to instructions stored electronically on an electronic storage medium. The one or more processing devices may include one or more devices configured through hardware, firmware, and/or software to be specifically designed for execution of one or more of the operations of method 62.

At an operation 64, a determination may be made as to whether a changeover of the server farm should be initiated. The determination may be made based on user inputs or commands, and/or based on monitoring of the operation of the server farm. Responsive to a determination that a changeover of the server farm should be initiated, method 62 may proceed to an operation 66. Responsive to a determination that a changeover of the server farm should not be initiated, method 62 may loop back over operation 64. In some implementations, operation 64 may be performed by a monitor module similar to or the same as monitor module 52 (shown in FIG. 1 and described above).

At operation 66, information stored in electronic storage associated with the server farm may be transferred to electronic storage associated with the single standby server device. Such information may include, for example, a configuration database of the server farm, a central administration website, information related to server application services being served by the server farm, and/or other information. The transfer of the information may include generation of one or more requests for information from the single standby server device, and/or reception of the information at the standby server device. In some implementations, operation 66 may be performed by a information transfer module similar to or the same as information transfer module 54 (shown in FIG. 1 and described above).

At an operation 68, startup of one or more of the server application services previously served by the server farm may be initiated on the standby server device. The order in which startups of server applications are initiated may be managed according to a predetermined order. For example, startup of a database service may be first be initiated at operation 68. This may bring the configuration database online. Subsequent to startup of the configuration database, startup of a central administration service may be initiated. Startup of the central administration service may result in the central administration website being brought online. Subsequent to startup of the central administration service, startups of other server application services may be initiated. The order in which startups at least some of the services are initiated may be in accordance with a predetermined order. In some implementations, operation 68 may be performed by a changeover coordination module similar to or the same as changeover coordination module 58 (shown in FIG. 1 and described above).

Responsive to startup of the database service, the servers of the server farm may be replaced by the standby server device at an operation 70. This may include replacing the servers of the server farm in the configuration database with the single standby server device. In some implementations, operation 70 may be performed by a server replacement module similar to or the same as server replacement module 56 (shown in FIG. 1 and described above).

At an operation 72, the configuration database may be adjusted to consolidate server roles that become redundant during changeover from the plurality of servers in the server farm to the single standby server device. In some implementations, operation 72 may be performed by a configuration management module similar to or the same as configuration management module 60 (shown in FIG. 1 and described above).

In some implementations, performance of operation 70 and/or 72 may be responsive to startup of the central administration service. This may the case if operation 70 and/or operation 72 is to be performed via the central administration website. Method 62 may loop back to operation 68 until all of the server application services have been brought online.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to backup a server farm having two or more servers configured to coordinate to serve a server application, the system comprising:
   a single standby server device configured to backup the server farm such that the server application is provided with high availability, the standby server device including electronic storage and a processor configured to execute computer modules, the computer modules comprising:
      a server application module configured to serve the server application;
      a monitor module configured to determine whether a changeover of the server farm should be initiated;
      an information transfer module configured to transfer information stored by the servers of the server farm to the electronic storage of the standby server device in response to determination by the monitor module that a changeover should be initiated, such information including a configuration database for the server farm and a central administration website associated with the server farm;
      a server replacement module configured to replace the servers of the server farm with the standby server device in information transferred from the servers of the server farm to the electronic storage of the standby server device; and
      a changeover coordination module configured to initiate startup, on the server application module executed on the standby server device, of the services previously provided by the server farm.

2. The system of claim 1, wherein the server replacement module is configured to replace the servers of the server farm with the standby server device in the configuration database for the server farm.

3. The system of claim 1, wherein the changeover coordination module is configured to initiate startup of the configuration database and the central administration website prior to startup of the other services previously provided by the server farm.

4. The system of claim 1, wherein the monitor module is configured to monitor operation of the server farm, and to determine a changeover should be initiated based on disruptions in operation of the server farm detected by the monitor module.

5. The system of claim 1, wherein the monitor module is configured to determine a changeover should be initiated based on reception of a switchover command from a user.

6. The system of claim 1, wherein the servers in the server farm comprise a first server configured to serve a web front-end, a second server configured to serve an index, shared services, and the central administration website, and a third server configured to serve databases including the configuration database.

7. The system of claim 6, wherein, prior to determination by the monitor module that changeover should be initiated, the monitor module is configured to monitor operation of the server farm while being excluded from the server farm.

8. The system of claim 1, wherein the computer program modules further comprise a configuration management module configured to adjust the configuration database after transfer to the electronic storage of the standby server device in order to consolidate server roles that become redundant during changeover from the plurality of servers in the server farm to the single standby server device by virtue of the reduction in the number of servers providing the services changed over from the plurality of servers to the single standby server device, the reduction being from more than one to one.

9. A computer-implemented method of backing up a server farm having two or more servers configured to coordinate to serve a server application, the method being implemented in a single standby server device having electronic storage and a processor configured to execute computer program modules, the method comprising:
   determining whether a changeover of the server farm should be initiated;
   responsive to a determination that changeover of the server farm should be initiated, receiving information stored by the servers of the server farm to the electronic storage of the standby server device, such information including a configuration database for the server farm and a central administration website associated with the server farm;
   replacing the servers of the server farm with the standby server device in information transferred from the servers of the server farm to the electronic storage of the standby server device;
   initiating startup, on the standby server device, of the services of the server application previously served by the server farm.

10. The method of claim 9, wherein replacing the servers of the server farm with the standby server device in the transferred information comprises replacing the servers of the server farm with the standby server device in the configuration database.

11. The method of claim 9, wherein initiating startup comprises initiating startup of the configuration database and the central administration website prior to startup of the other services previously provided by the server farm.

12. The method of claim 9, wherein determination as to whether a changeover should be initiated is based on a disruption in operation of the server farm detected by the single standby server device.

13. The method of claim 9, wherein determination as to whether a changeover should be initiated is based on reception of a switchover command from a user.

14. The method of claim 9, wherein the servers in the server farm comprise a first server configured to serve a web front-end, a second server configured to serve an index, shared services, and the central administration website, and a third server configured to serve databases including the configuration database.

15. The method of claim 9, wherein, prior to determination that changeover should be initiated, the single standby server device is excluded from the server farm.

16. The method of claim 9, further comprising adjusting the configuration database after transfer to the electronic storage of the standby server device in order to consolidate server roles that become redundant during changeover from the plurality of servers in the server farm to the single standby server device by virtue of the reduction in the number of servers providing the services changed over from the plurality of servers to the single standby server, the reduction being from more than one to one.

\* \* \* \* \*